United States Patent
Iwagaki et al.

(10) Patent No.: US 9,980,551 B2
(45) Date of Patent: May 29, 2018

(54) COSMETIC EYELID-RESHAPING TAPE AND METHOD FOR MANUFACTURING SAME

(71) Applicant: artsbrains. co. Ltd., Shibuya-ku (JP)

(72) Inventors: Naoko Iwagaki, Shibuya-ku (JP); Masayuki Kamagata, Shibuya-ku (JP); Jirou Taniyama, Shibuya-ku (JP)

(73) Assignee: artsbrains. co. Ltd., Shibuya-ku (JP)

( * ) Notice: Subject to any disclaimer, the term of this patent is extended or adjusted under 35 U.S.C. 154(b) by 0 days. days.

(21) Appl. No.: 14/913,434

(22) PCT Filed: Aug. 4, 2014

(86) PCT No.: PCT/JP2014/070449
§ 371 (c)(1),
(2) Date: Feb. 22, 2016

(87) PCT Pub. No.: WO2015/025700
PCT Pub. Date: Feb. 26, 2015

(65) Prior Publication Data
US 2016/0198835 A1    Jul. 14, 2016

(30) Foreign Application Priority Data
Aug. 23, 2013 (JP) ................................ 2013-173899

(51) Int. Cl.
*A45D 44/22* (2006.01)
*C09J 5/00* (2006.01)

(52) U.S. Cl.
CPC ................ *A45D 44/22* (2013.01); *C09J 5/00* (2013.01)

(58) Field of Classification Search
CPC ........... C09J 5/00; C09J 7/0253; A45D 44/22; A45D 44/00; Y10T 428/14; Y10T 428/28;
(Continued)

(56) References Cited

U.S. PATENT DOCUMENTS 4,653,483 A * 3/1987 Clavin .................. A45D 44/22
128/898
6,733,856 B2   5/2004 Nojiri
(Continued)

FOREIGN PATENT DOCUMENTS

JP    2-188512 A    7/1990
JP    10-304935 A   11/1998
(Continued)

OTHER PUBLICATIONS

International Search Report dated Nov. 4, 2014 in PCT/JP2014/070449 filed Aug. 4, 2014.

*Primary Examiner* — Patricia L. Nordmeyer
(74) *Attorney, Agent, or Firm* — Oblon, McClelland, Maier & Neustadt, L.L.P.

(57) ABSTRACT

A cosmetic eyelid-reshaping tape including a tape-like member, which is formed of a long narrow extensible base material piece having elastic contractility even after being extended, an adhesive applied to both surfaces of the tape-like member, and release sheet pieces, which are attached to the adhesive on both surfaces of the tape-like member, where the release sheet pieces are formed in the same shape as the tape-like member and have easy-to-tear portions in the middle thereof. The cosmetic eyelid-reshaping tape includes wave-shaped protruding portions formed, so as to protrude, over the entire side edges of the tape-like member in the longitudinal direction.

12 Claims, 9 Drawing Sheets

(58) Field of Classification Search
CPC ......... Y10T 428/1486; Y10T 428/1457; Y10T 428/1476
See application file for complete search history.

(56) References Cited

U.S. PATENT DOCUMENTS

| | | | |
|---|---|---|---|
| 8,597,751 B2 * | 12/2013 | Gotz .................... | B65H 19/102 428/343 |
| 2004/0134506 A1 | 7/2004 | Nojiri | |
| 2013/0122233 A1 | 5/2013 | Nojiri | |

FOREIGN PATENT DOCUMENTS

| | | |
|---|---|---|
| JP | 3277180 B1 | 4/2002 |
| JP | 3111511 U | 7/2005 |
| JP | 2005-334108 A | 12/2005 |
| JP | 2007-106711 A | 4/2007 |
| JP | 2007-111218 A | 5/2007 |
| JP | 2009-22592 A | 2/2009 |
| JP | 2009-195410 A | 9/2009 |
| JP | 3154139 U | 10/2009 |
| JP | 2013-394 A | 1/2013 |

\* cited by examiner

COSMETIC EYELID-RESHAPING TAPE AND METHOD FOR MANUFACTURING SAME

TECHNICAL FIELD

The present invention relates to a cosmetic eyelid-reshaping tape and a method for manufacturing the same. The cosmetic eyelid-reshaping tape is formed of a tape-like member formed by applying adhesive to an extensible base material piece that has elastic contractility even after being extended. By attaching the tape-like member, stretched to a predetermined length in which the base material piece is extended, to an eyelid, a fake plastic surgery effect, such as forming a fake double eyelid or forming a plump portion (so-called eye bag) on the lower eyelid, can be provided on the eyelid by utilizing elastic contractility of the base material piece.

Conventionally known double-eyelid-forming cosmetic products for transforming a single eyelid to a fake double eyelid without surgery include those of a solution type (Patent Literatures 1 to 3), in which a solution is applied to the skin of the eyelid, and those of a tape type (Patent Literatures 4 to 8), in which adhesive tape is attached to the skin of the eyelid. These solution-type and tape-type products are mainly classified, according to the method for forming the double eyelid, into a method (adhesion method) in which the crease of the double eyelid is formed by adhering the skin of the eyelid in a folded state with double-sided adhesive tape, adhesive, or the like and a method (shutter method) in which the crease of the double eyelid is formed by forming, on the skin of the eyelid, a film harder than the skin of the eyelid by applying a solution on the skin of the eyelid and drying the solution or by attaching adhesive tape to the skin of the eyelid, allowing the skin to be folded along the upper edge of the film when the eyelid is opened. However, because these conventional double-eyelid-forming cosmetic products forcibly form the crease of the double eyelid by using adhesion or a film provided by the solution or the tape, there have been problems in that the formed double eyelid tends to look unnatural, that the presence of such a product is noticeable, and that a user tends to feel discomfort, such as a feeling of being pulled.

To solve the above-described problems, the applicant has proposed a double-eyelid forming tape (Patent Literature 9) capable of forming a double eyelid by using a method completely different from the above-described conventional methods. This double-eyelid forming tape is formed of an extensible tape-like member composed of synthetic resin and having elastic contractility even after being extended, and, by utilizing the post-extension elastic contractility of the tape-like member, the tape-like member is made to sink into the eyelid, forming a recessed groove-like depression extending along the tape-like member. As a result, when the upper eyelid is opened, the upper eyelid is naturally folded at this depressed portion, forming the crease of the double eyelid. Furthermore, in recent years, cosmetic tapes for forming, utilizing the post-extension elastic contractility of the tape-like member, a depression below the lower eyelid so as to form a plump portion (i.e., a so-called eye bag) on the lower eyelid, creating an eye with depth and height, have been proposed and gathered attention.

CITATION LIST

Patent Literature

PTL 1: Japanese Unexamined Patent Application Publication No. 2007-106711

PTL 2: Japanese Registered Utility Model No. 3111511

PTL 3: Japanese Unexamined Patent Application Publication No. 02-188512

PTL 4: Japanese Registered Utility Model No. 3154139

PTL 5: Japanese Unexamined Patent Application Publication No. 10-304935

PTL 6: Japanese Unexamined Patent Application Publication No. 2005-334108

PTL 7: Japanese Unexamined Patent Application Publication No. 2007-111218

PTL 8: Japanese Unexamined Patent Application Publication No. 2009-195410

PTL 9: Japanese Patent No. 3277180

SUMMARY OF INVENTION

Technical Problem

When using the variety of above-described cosmetic eyelid-reshaping tapes for forming a depression along the tape-like member by making the tape-like member sink into the eyelid utilizing post-extension elastic contractility of the tape-like member, the tape-like member needs to be pulled and extended, and in this state, attached to the skin of the eyelid to allow the eyelid to contract with the tape. However, because an adhesive layer formed on the tape-like member is also extended when the tape-like member is extended, the thickness of the adhesive layer may be reduced or, in some cases, broken, creating a portion where the adhesive layer does not exist. Therefore, depending on the condition of the skin of the eyelid, when the tape-like member that has been pulled and extended is attached to the skin of the eyelid, sufficient adhesion between the tape-like member and the skin of the eyelid cannot be obtained, leading to sliding therebetween when contracting. As a result, there have been cases where a depression with a depth corresponding to the actual amount of contraction of the tape-like member, i.e., a depression with the depth needed to provide a fake plastic surgery effect on the eyelid, such as forming a fake double eyelid or forming a plump portion on the lower eyelid, cannot be formed in the eyelid.

The technical problem of the present invention is to provide a cosmetic eyelid-reshaping tape having improved adhesion to the skin of the eyelid and to provide a method for manufacturing the same. The cosmetic eyelid-reshaping tape is formed of a tape-like member formed by applying adhesive to a long narrow extensible base material piece that has elastic contractility even after being extended, and is configured such that, by attaching the tape-like member stretched to a length in which the base material piece is extended to the eyelid and allowing it to sink into the eyelid utilizing the elastic contractility of the base material piece after being extended, a depression extending along the tape-like member is formed in the eyelid.

Solution to Problem

To overcome the above-described problems, a cosmetic eyelid-reshaping tape of the present invention includes a tape-like member formed of a long narrow base material piece composed of synthetic resin, extensible in the longitudinal direction, and having elastic contractility even after being extended, and adhesive applied to one or both surfaces thereof, the adhesive serving to attach the base material piece to an eyelid, the tape-like member having a pair of holding areas to be held with fingertips, at one end and the other end in the longitudinal direction, and an attaching region to be attached to the eyelid, positioned between the pair of holding areas, the cosmetic eyelid-reshaping tape being configured such that, by attaching the attaching region of the tape-like member, stretched to a length in which the base material piece is extended, to the eyelid and allowing it to sink into the eyelid utilizing the elastic contractility of the base material piece after being extended, a depression extending along the tape-like member is formed in the eyelid. The tape-like member is formed, as a single component, of a core section that has a first side edge and a second side edge extending linearly from one end to the other end in the longitudinal direction and positioned on both sides in the width direction so as to be parallel to each other, and a protruding portion provided at least in the attaching region so as to protrude, in the width direction, from each of the first side edge and the second side edge of the core section.

In the present invention, "extend" means to stretch a base material piece composed of synthetic resin until it enters the plastic region, in other words, to plastically deform the base material piece, and "extensible" means that a user can extend the base material piece by hand to use it. Furthermore, "elastic contractility" means only almost momentary contraction having an elastic contractile force among contraction occurring when a force that pulls and extends the base material piece is removed, and "has elastic contractility even after being extended" means that the base material piece has elastic contractility even after being extended, thereby capable of forming a depression extending along the tape-like member by sinking into the eyelid so as to resist the firmness of the eyelid. The "eyelid" is a collective term for the upper eyelid and the lower eyelid.

In the cosmetic eyelid-reshaping tape of the present invention, when the holding areas of the tape-like member are held with the fingertips and pulled in the longitudinal direction to stretch the attaching region thereof to the above-described predetermined length in which the base material piece is extended, the adhesive layer of the attaching region is also extended simultaneously. Because the extension ratio of the base material piece becomes smaller at positions closer to the apexes of the protruding portions, the adhesive layer thereon may also have an appropriate thickness greater than that on the core section. Accordingly, when the tape-like member is kept stretched and the attaching region thereof is pressed against the skin of the eyelid, the attaching region can more reliably adhere to the skin of the eyelid, suppressing sliding between the tape-like member and the skin of the eyelid when the base material piece elastically contracts. Therefore, it becomes possible to more reliably form, in the eyelid, a depression with a depth corresponding to the actual amount of contraction of the tape-like member, i.e., a depression with the depth needed to provide a fake plastic surgery effect on the eyelid, such as forming a fake double eyelid or forming a plump portion (so-called eye bag) on the lower eyelid.

In the above-described cosmetic eyelid-reshaping tape, it is desirable that the plurality of protruding portions be formed at each of the first side edge and the second side edge. At this time, desirably, the protruding portions are formed so as to have a uniform height and a uniform pitch in each of the first side edge and the second side edge. More preferably, the height and pitch of the protruding portions on the first side edge and the height and pitch of the protruding portions on the second side edge are equal to each other. Further desirably, the protruding portions on the first side edge and the protruding portions on the second side edge are formed in opposite phases in the longitudinal direction of the tape-like member.

Furthermore, in the above-described cosmetic eyelid-reshaping tape, it is desirable that the tape-like member have a uniform width from one end to the other end in the longitudinal direction thereof. In particular, it is desirable that the protruding portions be formed in a wave shape. Note that the protruding portions may be formed over the entirety, from one end to the other end in the longitudinal direction, of the first side edge and the second side edge of the tape-like member.

Furthermore, it is desirable that the cosmetic eyelid-reshaping tape include a tape-like member formed of the base material piece and the adhesive applied to both sides thereof, and a release sheet piece formed in the same shape as the tape-like member from a synthetic resin having good releasability from the adhesive and attached to an adhesive surface of the tape-like member to which the adhesive is applied, and that the release sheet piece have an easy-to-tear portion, which is torn when pulled in the longitudinal direction, provided in the middle in the longitudinal direction so as to extend in the width direction. In this case, when the holding areas of the tape-like member are held, over the release sheet pieces, with the fingertips and pulled in the longitudinal direction, the release sheet piece is torn along the easy-to-tear portion, enabling the attaching region to be stretched to a predetermined length in which the base material piece is extended.

Meanwhile, in the cosmetic eyelid-reshaping tapes in which the tape-like member is disposed between the two release sheet pieces and in which the release sheet pieces and the tape-like member are formed in the same shape, because the tapes are individually separated, typically, a plurality of the tapes are stored in one case. However, in the tape previously proposed by the applicant with Patent Literature 9 listed above, side end faces of the tapes extend in the longitudinal direction so as to be parallel to each other, and edges of the adhesive layer are exposed from the end faces. Moreover, when cut into individual tapes in the manufacturing process, a portion of the adhesive is sometimes pushed out on the end faces. Thus, within the case, the side end faces of the tapes tend to adhere to one another along their end faces so as to be continuous in the longitudinal direction, making it difficult to separate the adhered tapes when using.

In contrast, in the cosmetic eyelid-reshaping tape of the present invention, the tape-like member is formed of the core section extending linearly from one end to the other end in the longitudinal direction thereof and having the first and second side edges, parallel to each other, at both sides in the width direction and the protruding portions provided at least in the attaching region so as to protrude, in the width direction, from each of the first and second side edges of the core section, and the above-described release sheet pieces have the same shape as the tape-like member. Therefore, as long as the tapes stored in the case are slightly shifted from one another in the longitudinal direction, even if the side end faces of the tapes adhere to each other, such adhesion occurs at points or in a discontinuous manner, preventing continuous adhesion along their end faces. Accordingly, the adhered tapes can be easily separated from one another when taken out of the case to be used.

Furthermore, the cosmetic eyelid-reshaping tape of the present invention is particularly suitable for use as a double-eyelid forming tape. In such a case, by attaching the attaching region of the tape-like member, stretched to a predetermined length in which the base material piece is extended, to the upper eyelid and allowing the tape-like member to sink into the upper eyelid utilizing the elastic contractility of the base material piece after being extended, a depression extending along the tape-like member is formed in the upper eyelid, and, when the upper eyelid is opened, the upper eyelid is folded along the depression, forming the crease of the double eyelid. Meanwhile, also when a plump portion is to be formed on the lower eyelid using the cosmetic eyelid-reshaping tape of the present invention, similarly to the above, by attaching the attaching region of the tape-like member, stretched to a predetermined length in which the base material piece is extended, to a position, in the lower eyelid, below the position where a plump portion is to be formed and allowing the tape-like member to sink into this position utilizing the elastic contractility of the base material piece after being extended, a depression extending along the tape-like member is formed in that position. In this way, a plump portion is formed above the depression formed in the lower eyelid, creating an eye with depth and height.

Note that the cosmetic eyelid-reshaping tape of the present invention may be formed by a method including the following steps:

(1) a step of preparing an adhesive sheet in which adhesive is applied to one or both surfaces of a base material sheet that is composed of synthetic resin and is used to form the base material piece; and (2) a step of obtaining the cosmetic eyelid-reshaping tape by cutting the adhesive sheet with a cutting blade with a cutting edge having the same outline shape as that of the protruding portions, while moving the cutting blade and the adhesive sheet relative to each other.

When the cosmetic eyelid-reshaping tape of the present invention is used, a pair of holding areas positioned at one end and the other end of the tape-like member in the longitudinal direction are held with the fingertips, the tape-like member is pulled in the longitudinal direction, and the attaching region is pressed against the eyelid and attached thereto with the attaching region located between these holding areas being stretched to a predetermined length in which the base material piece is extended (that is, with the tape-like member being pulled). Then, when the fingertips are released from the holding areas, the skin of the eyelid contracts with the contraction of the base material piece. Because the skin of the eyelid has an outwardly protruding curved surface substantially conforming to the shape of the eye, the tape-like member sinks into the eyelid, forming a depression with the depth needed to provide a fake plastic surgery effect on the eyelid, i.e., forming a fake double eyelid or forming a plump portion on the lower eyelid, along the tape-like member.

Advantageous Effects of Invention

In the cosmetic eyelid-reshaping tape of the present invention, when the holding areas of the tape-like member are held with the fingertips and pulled in the longitudinal direction to stretch the attaching region thereof to the above-described predetermined length in which the base material piece is extended, the adhesive layer of the attaching region is also extended simultaneously. Because the extension ratio of the base material piece becomes smaller at positions closer to the apexes of the protruding portions, the adhesive layer thereon may also have an appropriate thickness greater than that on the core section. Accordingly, when the tape-like member is kept stretched and the attaching region thereof is pressed against the skin of the eyelid, the attaching region can more reliably adhere to the skin of the eyelid, suppressing sliding between the tape-like member and the skin of the eyelid when the base material piece elastically contracts. Therefore, it becomes possible to more reliably form, in the eyelid, a depression with a depth corresponding to the actual amount of contraction of the tape-like member, i.e., a depression with the depth needed to provide a fake plastic surgery effect on the eyelid, such as forming a fake double eyelid or forming a plump portion on the lower eyelid.

DESCRIPTION OF EMBODIMENTS

Embodiments of a cosmetic eyelid-reshaping tape of the present invention will be described in detail below using the drawings. Note that the description will be given below by taking a double-eyelid forming tape, among cosmetic eyelid-reshaping tapes, as an example. As shown in FIGS. 1 to 5, a double-eyelid forming tape 1, serving as a cosmetic eyelid-reshaping tape 1 of the present invention, includes a tape-like member 2 formed by applying adhesive 4 and 4 to both surfaces of a long narrow film-like base material piece 3, which is composed of synthetic resin, can be extended when stretched in the longitudinal direction, and has elastic contractility even after being extended. The base material piece 3 is attached to the upper eyelid with the adhesive 4 and 4.

The tape-like member 2 includes a pair of holding areas 2a and 2a to be held with the fingertips, located at one end and the other end in the longitudinal direction, and an attaching region 2b to be attached to the upper eyelid, located between the pair of holding areas 2a and 2a. The tape-like member 2 also includes a core section 21 that has, on both sides in the width direction, a first side edge 21a and a second side edge 21b extending linearly from one end to the other end in the longitudinal direction and parallel to each other, and a first protruding portion 22 and a second protruding portion 23 provided so as to protrude, in the width direction, from the first and second side edges 21a and 21b of the core section 21, respectively. In the present invention, the first side edge 21a and the second side edge 21b, which define the core section 21, are the side edges and their extension lines, in the longitudinal direction, of a portion of the base material piece 3 that is directly subjected to pulling forces in two directions and is extended when the attaching region 2b is stretched to a predetermined length in which the base material piece 3 is extended, and the first side edge 21a and the second side edge 21b pass base edges 22a and 23a, which are located on the extreme inner side of the protruding portions 22 and 23 of the attaching region 2b, respectively.

Figure 1:
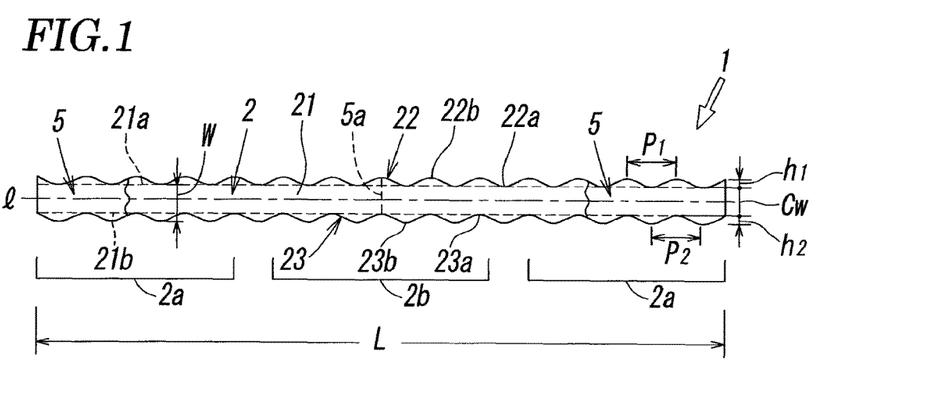
FIG. 1 is a partially broken plan view showing a double-eyelid forming tape, serving as an embodiment of a cosmetic eyelid-reshaping tape of the present invention.
Figure 2:
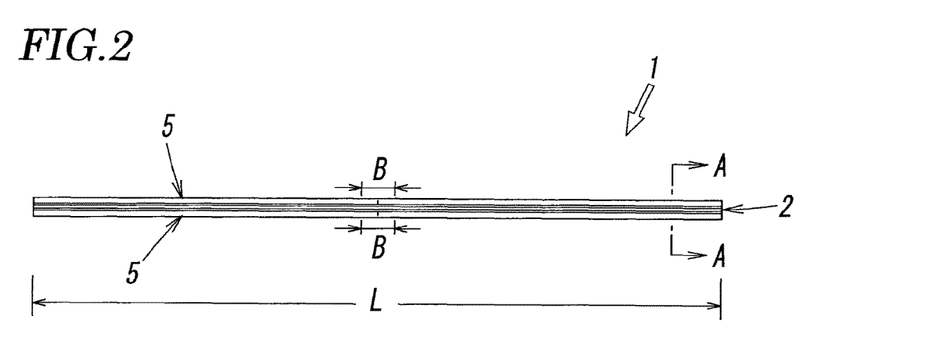
FIG. 2 is a side view of the tape in FIG. 1.
Figure 3:
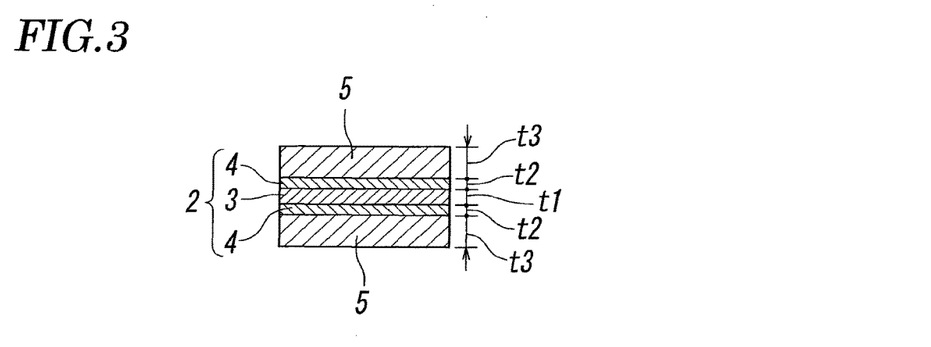
FIG. 3 is an A-A sectional view of the tape in FIG. 2.
Figure 4:
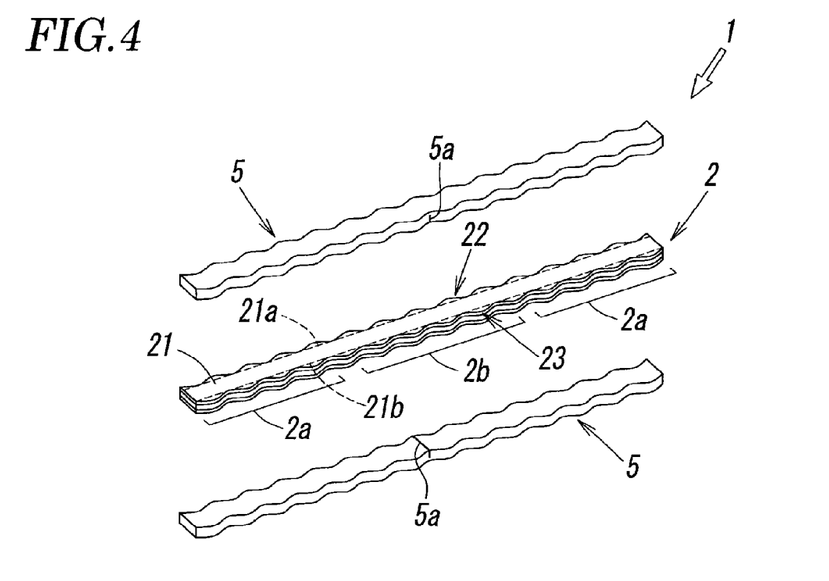
FIG. 4 is an exploded perspective view of the tape in FIG. 1.

More specifically, in this embodiment, at each of the first and second side edges 21a and 21b of the core section 21, the plurality of smoothly connected wave-like protruding portions 22 and 23 are formed so as to have uniform heights h1 and h2 and uniform pitches p1 and p2 over the entirety of the tape-like member 2 from one end to the other end in the longitudinal direction. Moreover, the height h1 and the pitch p1 of the protruding portions 22 on the first side edge 21a and the height h2 and the pitch p2 of the protruding portions 23 on the second side edge are formed equal to each other. Furthermore, the protruding portions 22 on the first side edge 21a and the protruding portions 23 on the second side edge 21b are formed in opposite phases in the longitudinal direction of the tape-like member 2 (i.e., the apexes 22b of the protruding portions 22 on the first side edge 21a are provided so as to correspond to the base edges 23a of the protruding portions 23 on the second side edge 21b, and conversely, the apexes of the protruding portions 23 on the second side edge 21b are provided so as to correspond to the base edges 22a of the protruding portions 22 on the first side edge 21a). As a result, the tape-like member 2 has a uniform width W over the entirety, from one end to the other end thereof.

Figure 6:
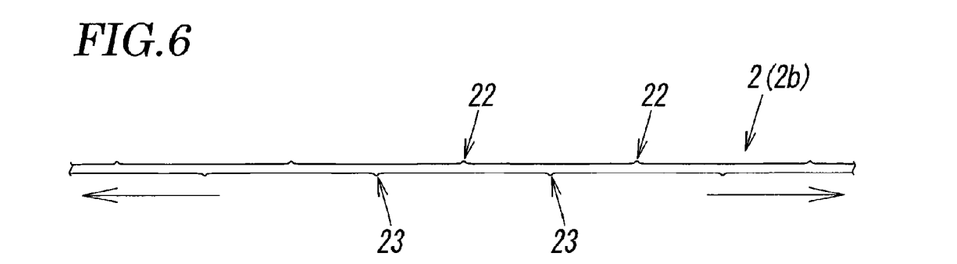
FIG. 6 is a schematic view showing a state of an attaching region when the tape-like member is stretched to a predetermined length in which the base material piece is extended, in the tape of FIG. 1.

When the attaching region 2b of the thus-configured tape-like member 2 is stretched to a predetermined length in which the base material piece 3 is extended, a state as shown in FIG. 6 results. At this time, because the extension ratio of the core section 21 is large, the adhesive 4 on the core section 21 is also extended in a similar manner. As a result, the adhesive 4 is reduced in thickness and, in some cases, is broken, creating a portion where the adhesive 4 does not exist and decreasing adhesion to the skin of the upper eyelid. To counter this problem, the protruding portions 22 and 23 as described above are provided at least in the attaching region 2b of the tape-like member 2. By doing so, because the extension ratio of the base material piece 3 constituting the protruding portions 22 and 23 becomes smaller at positions closer to the apexes 22b and 23b, the adhesive 4 thereon may have an appropriate thickness larger than that on the core section 21, thus making it possible to ensure sufficient adhesion to the skin of the upper eyelid. Accordingly, when the attaching region 2b is pressed against the skin of the upper eyelid with the tape-like member 2 being kept stretched, the attaching region 2b can more reliably adhere to the skin of the upper eyelid, and sliding between the tape-like member 2 and the skin of the eyelid occurring when the base material piece 3 elastically contracts can be suppressed. Therefore, it becomes possible to more reliably form a depression corresponding to the actual amount of contraction of the tape-like member 2, i.e., a depression with the depth needed to form a fake double eyelid, in the eyelid.

Examples of the synthetic resin used to form the base material piece 3 include polyolefin resin and vinyl chloride resin, which can be easily stretched with the fingertips and made to enter their plastic regions (extended) and which have elastic contractility even after being extended, and more preferably, the base material piece 3 is composed of polyethylene, and in particular, low-density polyethylene is most suitable. Furthermore, it is desirable that the axial extension ratio of the base material piece 3 during manufacturing of the film, particularly in the longitudinal direction thereof (i.e., the direction of axis 1), be zero or an extremely low value. Note that additives, such as a colorant and glitter particles, may be added to the synthetic resin constituting the base material piece 3, if necessary.

Although, when the base material 3 is formed of low-density polyethylene, the dimensions of the above-described tape-like member 2, i.e., the dimensions of the base material 3, should be determined by taking into consideration the usability, portability, etc. in the actual use, it is desirable that the length L be approximately 25 to 40 mm, and, in this length, the length of the attaching region 2b after being extended be approximately 5 to 10 cm. Although the width of the core section (i.e., the distance between the first side edge 21a and the second side edge 21b) Cw and the thickness t1 of the base material piece 3 should be determined by taking into consideration the width and thickness when attached to the upper eyelid after being extended and the comfortableness when fitted to the upper eyelid, it is desirable that Cw be approximately 1.0 to 5.0 mm and t1 be approximately 40 to 80 μm. Although the pitches p1 and p2 and the heights h1 and h2 of the protruding portions 22 and 23 should be determined by taking into consideration the ability to suppress sliding between the tape-like member 2 and the skin when fitted to the upper eyelid after being extended, the width when attached to the upper eyelid, or the like, it is desirable that p1 and p2 be approximately 1.5 to 4.0 mm and h1 and h2 be approximately 0.3 to 0.6 mm. At this time, it is desirable that the sum of the heights h1 and h2 of the protruding portions 22 and 23 be smaller than the width Cw of the core section 21. However, the dimensions of the base material piece 3 are not limited to those ranges, but may be appropriately determined by taking into consideration the material of the base material piece 3, as well as the results of sensory evaluation, such as usability, comfortableness, and the appearance of the formed double eyelid.

Although an acrylic adhesive for skin is suitably used as the adhesive 4 and 4, the adhesive is not limited thereto, and any adhesive that can be used on skin may be used. At this time, from the standpoint of adhesion to the skin of the eyelid, the thickness t2 of the adhesive 4 and 4 is desirably approximately 40 to 60 μm. However, the thickness is not limited to this range, but may be appropriately determined according to the property of the adhesive. Furthermore, the adhesive 4 and 4 on both sides of the tape-like member 2 may be different adhesives, and the thickness t2 of the adhesive 4 and 4 may also be different.

The above-described double-eyelid forming tape 1 further includes release sheet pieces 5 and 5, which are formed of a synthetic resin having good releasability from the adhesive 4 and attached to both sides, i.e., the adhesive surfaces to which the adhesive 4 and 4 are applied, of the tape-like member 2. The release sheet pieces 5 are formed in the same shape (that is, formed to have the same outline and dimensions in plan view) as the tape-like member 2 in plan view and cover the entire adhesive surfaces of the tape-like member 2, to which the adhesive 4 and 4 are applied. The release sheet pieces 5 are provided with easy-to-tear portions 5a, which are torn when pulled in the longitudinal direction, in the middle in the longitudinal direction thereof so as to extend linearly in the width direction.

Figure 5:
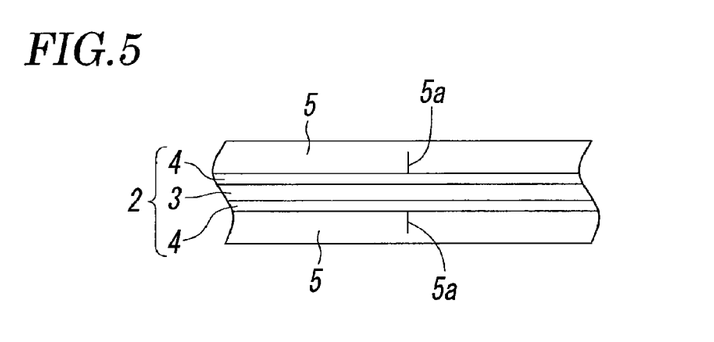
FIG. 5 is an enlarged view of a portion B, including an easy-to-tear portion, of the tape in FIG. 2.

At this time, as shown in FIG. 5, the easy-to-tear portions 5a are formed by cutting the release sheet pieces 5 to the middle thereof in the thickness direction from the inner surfaces thereof in contact with the adhesive 4, thereby preventing the easy-to-tear portions 5a from unintentionally torn before using. Furthermore, herein, although the inner surfaces of the release sheet pieces 5 are formed as mirror surfaces and the outer surfaces of the release sheet pieces 5 are formed as rough surfaces having fine unevenness, by reversing the release sheet pieces 5 to change the surfaces to be in contact with the adhesive 4, the releasability between the release sheet pieces 5 and the adhesive 4 can be adjusted.

Herein, the release sheet pieces 5 are formed integrally of silicone resin having good releasability from the adhesive 4 and having good tearability at the easy-to-tear portions 5a. The silicone resin having higher hardness is more desirable as such silicone resin has good tearability. Although the thickness t3 of the silicone resin is desirably approximately 0.3 to 0.5 mm, it is not specifically limited thereto. The release sheet pieces 5 may be, for example, release paper formed by providing an easy-to-release layer formed of silicone resin on paper. Furthermore, the easy-to-tear portions 5a do not necessarily have to be slits (half-cutting) as above, but may be, for example, V-shaped notches.

Figure 7:
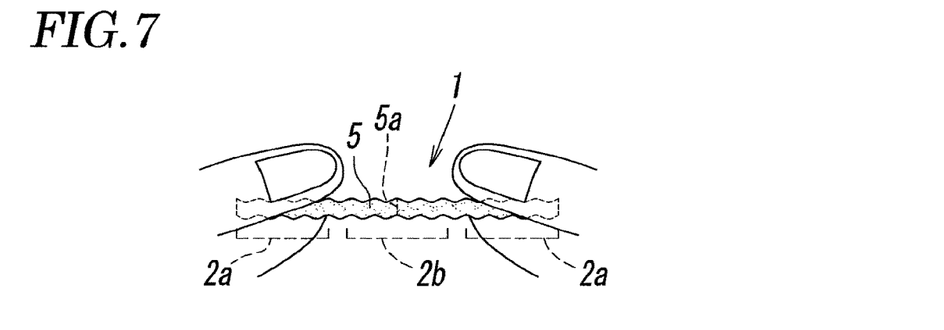
FIG. 7 is Schematic View 1 showing a method for forming a double eyelid using the cosmetic eyelid-reshaping tape of the present invention.
Figure 8:
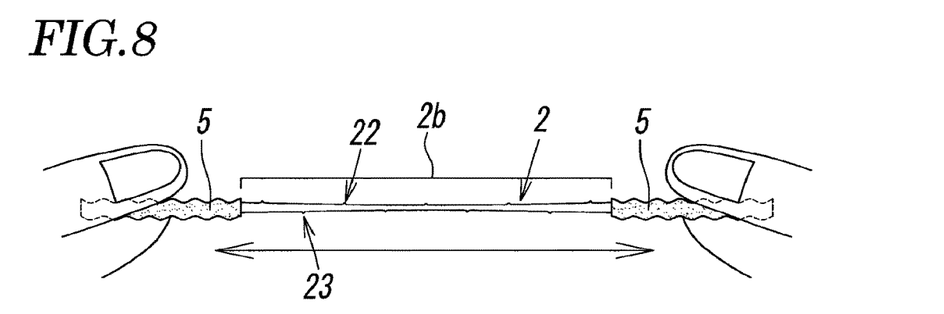
FIG. 8 is Schematic View 2 similar to FIG. 7.

A method for forming a double eyelid using the above-described double-eyelid forming tape 1, serving as the cosmetic eyelid-reshaping tape 1 of the present invention, will be described below on the basis of FIGS. 7 to 13. First, although illustration is omitted, after removing oiliness from the upper eyelid on which a double eyelid is to be formed, the position where the crease of the double eyelid is to be formed by using a pusher or the like is confirmed. Next, as shown in FIG. 7, the holding areas 2a and 2a of the tape-like member 2 in the double-eyelid forming tape 1 are held, over the release sheet pieces 5, with the fingertips. At this time, it is desirable that at least about 1 cm of the attaching region 2b be left between the holding areas 2a and 2a. When the tape 1 is pulled in the longitudinal direction, the release sheet pieces 5 are split at the easy-to-tear portions 5a formed in the middle and are released from the adhesive 4 and 4 of the attaching region 2b, and the attaching region 2b of the tape-like member 2 is exposed from inside while being stretched. When further stretched, as shown in FIG. 8, the base material piece 3 of the attaching region 2b is extended and plastically deformed (i.e., in a state in which it does not return to its initial length even after the pulling force is removed). At this time, the base material piece 3 may involve so-called necking.

Figure 9:
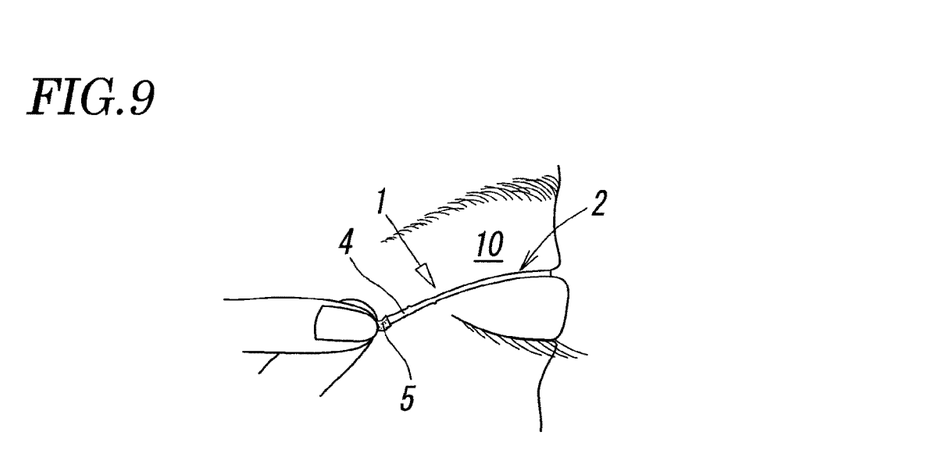
FIG. 9 is Schematic View 3 similar to FIG. 7.

When the attaching region 2b of the tape-like member 2 has been stretched to approximately 5 to 10 cm, the stretching is stopped, and, as shown in FIG. 9, the stretched tape-like member 2, with the attaching region 2b being tightly stretched, is pressed onto the position on the upper eyelid 10 where the crease of the double eyelid is to be formed, thereby attaching the attaching region 2b to the upper eyelid with the adhesive 4. Then, the hands are removed from the tape 1, removing the pulling force applied to the tape-like member 2 and the pressing force applied to the upper eyelid 10. At this time, as described above, the attaching region 2b is more reliably attached to the skin of the upper eyelid, with the effect of the adhesive 4 of the protruding portions 22 and 23.

Figure 10:
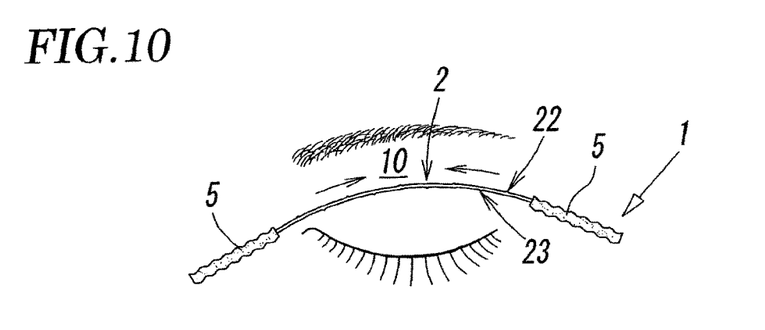
FIG. 10 is Schematic View 4 similar to FIG. 7.
Figure 11:
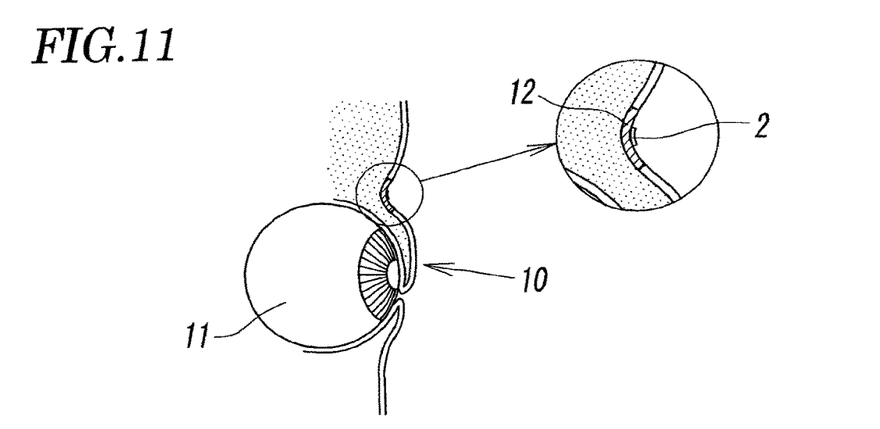
FIG. 11 is Schematic View 5 similar to FIG. 7.
Figure 12:
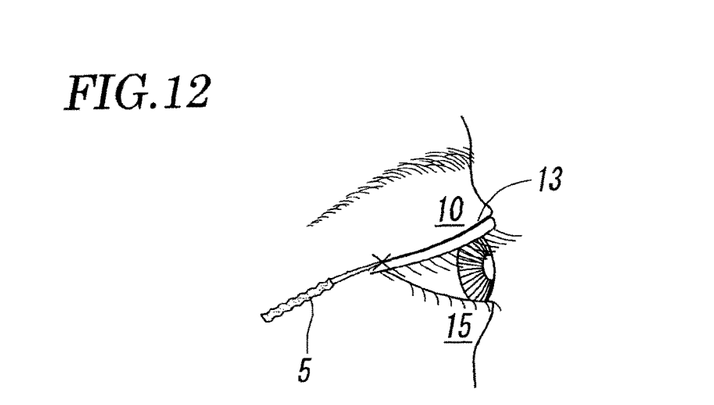
FIG. 12 is Schematic View 6 similar to FIG. 7.
Figure 13:
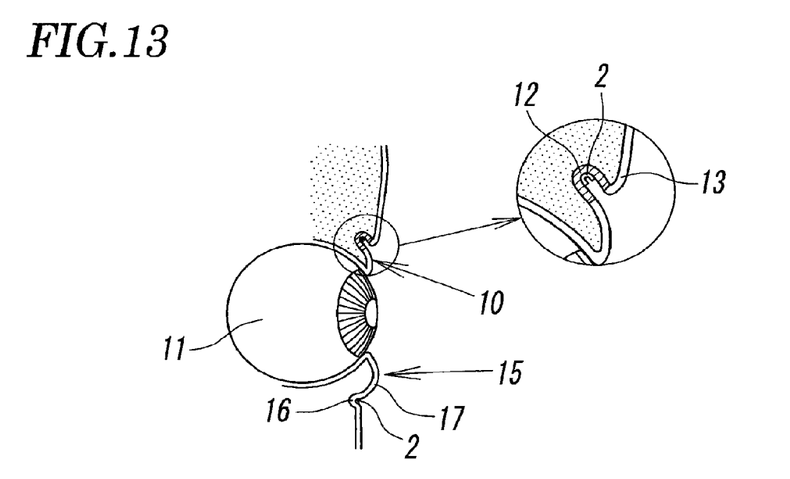
FIG. 13 is Schematic View 7 similar to FIG. 7.

As a result, as shown in FIG. 10, in accordance with the elastic contraction of the extended base material piece 3, the skin of the upper eyelid 10 also contracts with the attaching region 2b of the tape-like member 2 attached to the eyelid. As shown in FIG. 11, because the skin of the upper eyelid 10 has an outwardly protruding curved surface substantially conforming to the shape of an eye 11, the tape-like member 2 sinks into the upper eyelid 10, forming a recessed groove-like depression 12 along the tape-like member 2. At this time, the tape-like member 2 is adhered to the bottom of the depression 12. When the upper eyelid 10 is opened, as shown in FIGS. 12 and 13, the upper eyelid 10 is naturally folded along the depression 12, forming a crease 13 of the double eyelid. Note that the redundant portions at both ends of the tape-like member 2, which are not adhered to the skin of the upper eyelid 10, are cut away with a cutter knife or the like at appropriate positions (the position indicated with x in FIG. 12). Thereafter, the shape of the double eyelid may be adjusted with a pusher or the like (not shown).

The cosmetic eyelid-reshaping tape 1 of the present invention may alternatively be used as a tape for forming a plump portion (so-called eye bag) 17 on the lower eyelid 15, as shown in FIG. 13. In such a case, similarly to the above-described case where the double eyelid is formed, the attaching region 2b of the tape-like member 2, stretched to a predetermined length in which the base material piece 3 is extended, is attached to a position, in the lower eyelid 15, below the position where the plump portion 17 is to be formed and is made to sink therein, utilizing the elastic contractility of the base material piece 3 after being extended. Thus, a depression 16 extending along the tape-like member 2 is formed. As a result, the plump portion 17 is formed above the depression 16 formed in the lower eyelid 15, creating an eye with depth and height. Note that, when the cosmetic eyelid-reshaping tape 1 of the present invention is used to form the plump portion 17 on the lower eyelid 15 as in this case, the length, L, of the tape 1 may be smaller than that used to form a double eyelid. Because the other configurations are basically the same as those of the above-described double-eyelid forming tape 1, the descriptions thereof will be omitted to avoid redundancy.

Meanwhile, in the cosmetic eyelid-reshaping tapes 1 like this in which the tape-like member 2 is disposed between the two release sheet pieces 5 and 5 and in which the release sheet pieces 5 and 5 and the tape-like member 2 are formed in the same shape, the tapes 1 are individually separated. Hence, when produced on a commercial basis, typically, a plurality of the tapes 1 are stored in one case so as to be parallel in the longitudinal direction. However, in the tape previously proposed by the applicant with Patent Literature 9 listed above, side end faces of the tape extend in the longitudinal direction so as to be parallel to each other, and edges of the adhesive layer are exposed from the end faces. Moreover, a portion of the adhesive is sometimes pushed out onto the end faces when cut into individual tapes in the manufacturing process. Thus, within the case, the side end faces of the tapes tend to adhere to one another along their end faces so as to be continuous in the longitudinal direction, making it difficult to separate the adhered tapes when using.

In contrast, in the cosmetic eyelid-reshaping tape 1 of the present invention, the tape-like member 2 is formed of the core section 21 extending linearly from one end to the other end in the longitudinal direction thereof and having the first and second side edges 21a and 21b, parallel to each other, at both sides in the width direction and the protruding portions 22 and 23 provided at least in the attaching region 2b so as to protrude, in the width direction, from the first and second side edges 21a and 21b of the core section 21, respectively, and the above-described release sheet pieces 5 and 5 have the same shape as the tape-like member 2. Therefore, as long as the tapes 1 stored in the case are slightly shifted from one another in the longitudinal direction, even if the side end faces of the tapes 1 adhere to each other, such adhesion occurs at points or in a discontinuous manner, preventing continuous adhesion along their end faces. Accordingly, the adhered tapes can be easily separated from one another when taken out of the case to be used.

Figure 14:
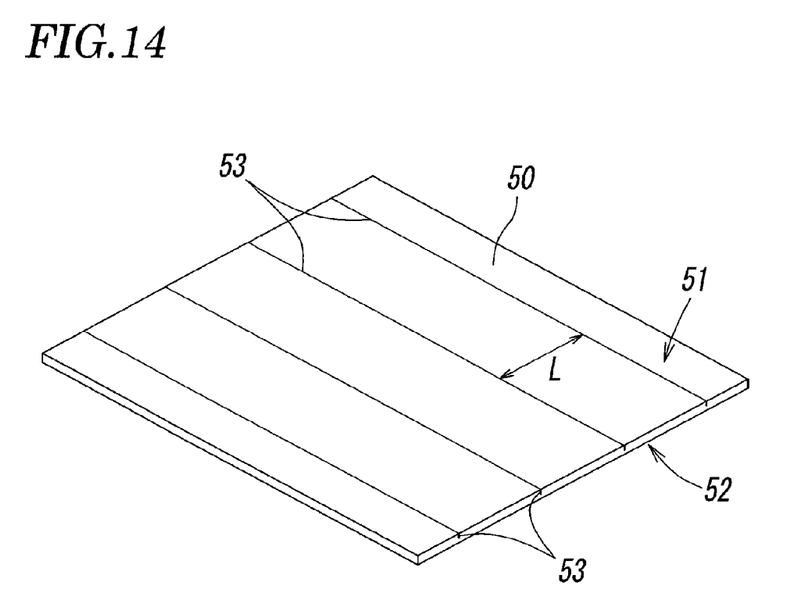
FIG. 14 is Schematic View 1 showing a process of manufacturing the cosmetic eyelid-reshaping tape of the present invention.

A method for manufacturing the double-eyelid forming tape 1, serving as the above-described cosmetic eyelid-reshaping tape 1, will be described below using FIGS. 14 to 18. First, a double-sided adhesive sheet 25 (FIG. 15), which is formed by applying the adhesive 4 and 4 to both sides of a base material sheet 30, which is composed of synthetic resin, such as polyolefin resin or vinyl chloride resin, is prepared. Furthermore, as shown in FIG. 14, release sheets 50 each having a first surface 51, which is a mirror surface, and a second surface 52, which is on the other side of the first surface 51 and is a rough surface, are formed by heat-shaping silicone resin with high hardness. Then, a plurality of easy-to-tear lines 53, cut to the middle thereof in the thickness direction and parallel to one another at equal intervals L, are formed in the first surface 51.

Figure 15:
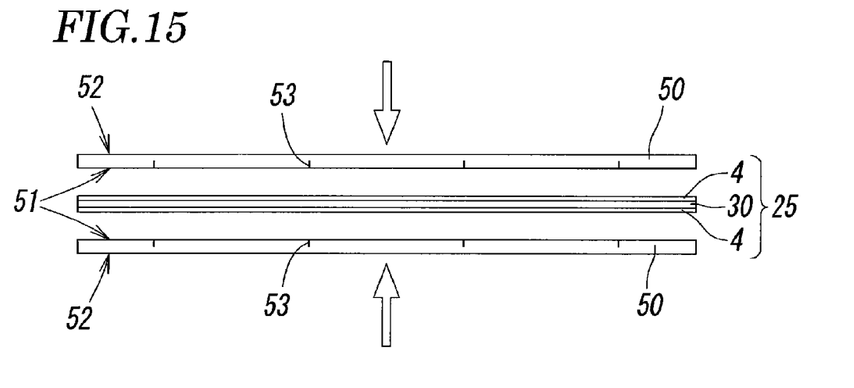
FIG. 15 is Schematic View 2 similar to FIG. 14.
Figure 16:
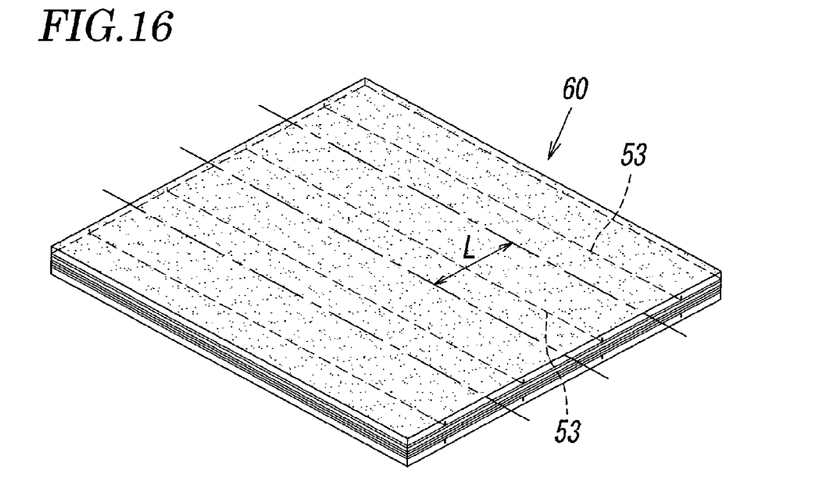
FIG. 16 is Schematic View 3 similar to FIG. 14.

Next, as shown in FIGS. 15 and 16, the first surfaces 51 of the two release sheets 50 are attached to the adhesive 4 and 4 on both sides of the double-sided adhesive sheet 25. Thus, a layered sheet 60, in which the double-sided adhesive sheet 25 is disposed between the two release sheets 50 and 50 is formed. At this time, the easy-to-tear lines 53 and 53 in the two release sheets 50 and 50 extend in the same direction and face each other. Furthermore, it is desirable that the axial extension ratio of the base material sheet 30 of the double-sided adhesive sheet 25 during manufacturing of the film, particularly in the direction perpendicular to the easy-to-tear lines 53, be zero or an extremely low value. Then, as indicated by one-dot chain lines in FIG. 16, the layered sheet 60 is cut at intermediate positions between the adjacent easy-to-tear lines 53 so as to be parallel to the easy-to-tear lines 53, thus forming long narrow strips of layered sheets 61 having a width L.

Figure 17:
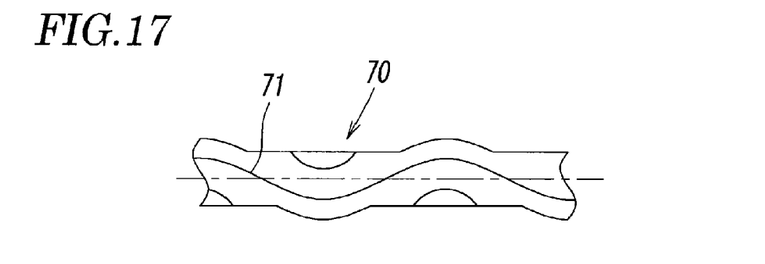
FIG. 17 is Schematic View 4 similar to FIG. 14.
Figure 18:
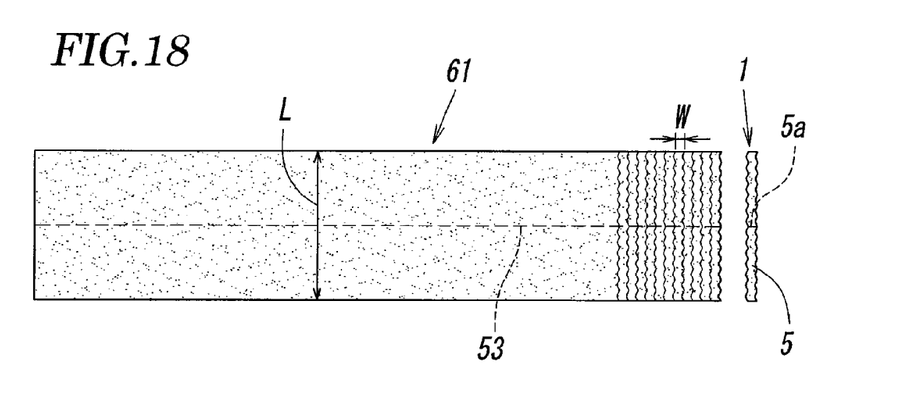
FIG. 18 is Schematic View 5 similar to FIG. 14.

Subsequently, a cutting blade 70 with a cutting edge 71 having the same outline shape as that of the protruding portions 22 and 23, as shown in FIG. 17, is prepared. Then, as shown in FIG. 18, while the cutting blade 70 and the strip-shaped layered sheet 61 are moved relative to each other with a feeding width W in the longitudinal direction of the sheet 61, the sheet 61 is cut into narrow pieces with the cutting blade 70, in the direction perpendicular to the easy-to-tear lines 53. As a result, the double-eyelid forming tapes 1 having the easy-to-tear portions 5a provided in the middle in the longitudinal direction thereof can be obtained.

Figure 19:
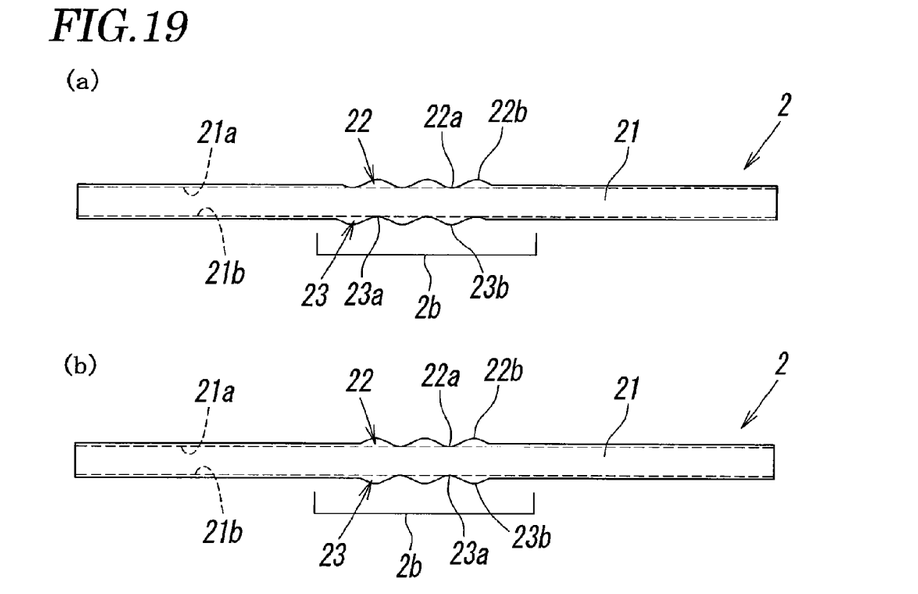
FIGS. 19(a) and 19(b) are both plan views of a tape-like member according to another embodiment of the cosmetic eyelid-reshaping tape of the present invention.
Figure 20:
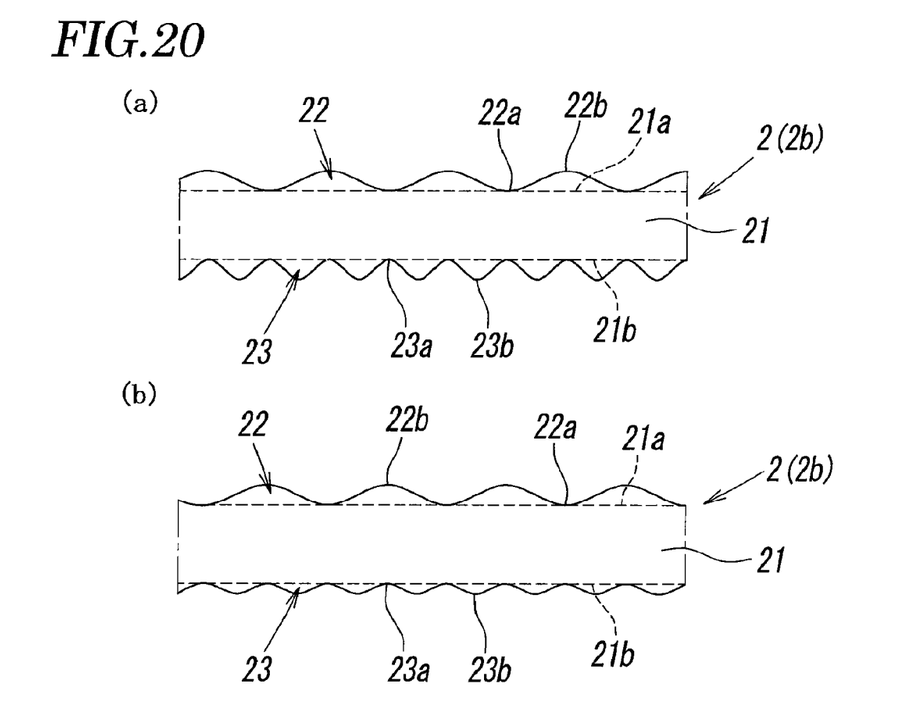
FIGS. 20(a) and 20(b) are both plan views of an attaching region of a tape-like member according to another embodiment of the cosmetic eyelid-reshaping tape of the present invention.
Figure 21:
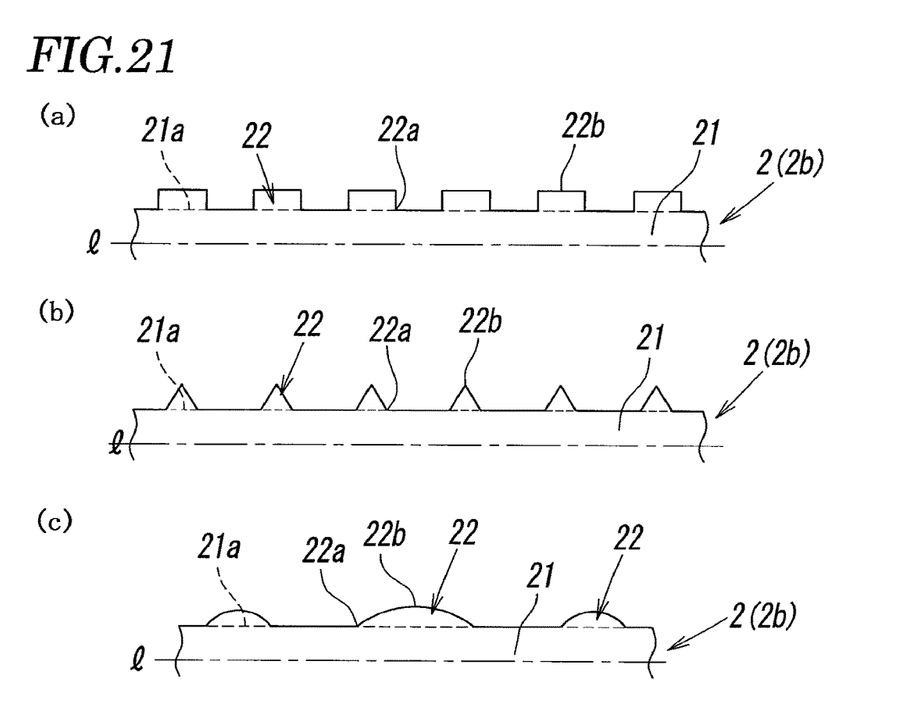
FIGS. 21(a) to 21(c) are partial plan views of an attaching region of a tape-like member according to another embodiment of the cosmetic eyelid-reshaping tape of the present invention.

The shape of the protruding portions 22 and 23 of the tape-like member 2 is not limited to that shown in FIG. 1. For example, as shown in FIGS. 19(a) and 19(b), the protruding portions 22 and 23 may be provided only in the attaching region 2b of the tape-like member 2, and, as shown in FIG. 19(b), the protruding portions 22 and 23 on both sides may be formed in the same phase. Furthermore, as shown in FIGS. 20(a) and 20(b), the pitches p1 and p2 of the protruding portions 22 and 23 may be differentiated from each other, and, as shown in FIG. 20(b), the heights h1 and h2 of the protruding portions 22 and 23 may also be differentiated from each other. Moreover, as shown in FIGS. 21(a) and 21(b), the protruding portions 22 and 23 having a rectangular shape or a triangular shape may be provided at predetermined intervals so as to protrude, or, as shown in FIG. 21(c), arch-shaped protruding portions 22 and 23 having different heights h1 and h2 may be provided at predetermined intervals so as to protrude. Furthermore, these arrangements and shapes of the protruding portions 22 and 23 may be used in combination. Note that the protruding portions 22 and 23 of the tape-like member 2 shown in FIGS. 20 and 21 may of course be provided either only within the range of the attaching region 2b, as one shown in FIG. 19, or over the entire tape-like member 2 in the longitudinal direction, as one shown in FIG. 1.

Although the embodiments of the present invention have been described in detail above, the present invention is not limited thereto, and, various design changes within a scope not departing from the spirit of the present invention are of course possible. For example, the tape-like member 2 may be formed by applying the adhesive 4 only to one side of the base material piece 3. In such a case, it is only necessary to attach the release sheet piece 5 only to that side. Furthermore, a plurality of the tape-like members 2 may be attached to a sheet having good releasability, such as release paper formed by providing an easy-to-release layer, composed of silicone resin, on paper.

REFERENCE SIGNS LIST 1 cosmetic eyelid-reshaping tape (double-eyelid forming tape)
2 tape-like member
2a holding area
2b attaching region
3 base material piece
4 adhesive
5 release sheet piece
5a easy-to-tear portion
21 core section
21a first side edge
21b second side edge
22 first protruding portion
22a base edge
22b apex
23 second protruding portion
23a base edge
23b apex

The invention claimed is:
1. A cosmetic eyelid-reshaping tape, comprising:
a member comprising a long narrow base material piece comprising synthetic resin, extensible in the longitudinal direction, and having elastic contractility even after being extended; and
adhesive applied to one or both surfaces of the member, the adhesive serving to attach the base material piece to an eyelid,
the member having a pair of holding areas to be held with fingertips, at one end and the other end in the longitu- dinal direction, and an attaching region to be attached to the eyelid, positioned between the pair of holding areas, the cosmetic eyelid-reshaping tape being configured such that, by attaching the attaching region of the member, stretched to a length in which the base material piece is extended, to the eyelid and allowing it to sink into the eyelid utilizing the elastic contractility of the base material piece after being extended, a depression extending along the member is formed in the eyelid, wherein the member comprises, as a single component, a core section that has a first side edge and a second side edge extending linearly from one end to the other end in the longitudinal direction and positioned on both sides in the width direction so as to be parallel to each other, and a protruding portion provided at least in the attaching region so as to protrude, in the width direction, from each of the first side edge and the second side edge of the core section, wherein the sum of the height of the protruding portions are formed smaller than the width of the core section, wherein a height (h1) and a pitch (p1) of the protruding portions on the first side edge and a height (h2) and a pitch (p2) of the protruding portions on the second side edge are formed equal to each other such that h1=h2 and p1=p2, wherein the width of the core section is from 1.0 to 5.0 mm, the height (h1) of the first protruding portions and the height (h2) of the second protruding portions are in the range of 0.3 to 0.6 mm, and the pitch (p1) of the first protruding portions and the pitch (p2) of the second protruding portions are in the range of 1.5 to 4.0 mm.

2. The cosmetic eyelid-reshaping tape according to claim 1,
wherein the protruding portion has, at both ends of the longitudinal direction, a pair of base edges which are located on an innermost side in the width direction of the member, and has, between the pair of base edges in the longitudinal direction, an apex which is located on an outermost side in the width direction of the member,
wherein, at each of the first side edge and the second side edge, a plurality of the protruding portions, in which the pair of base edges are provided on the each of the first side edge and the second side edge, are formed to have uniform heights from the base edges to the apex and are connected along the longitudinal direction, and
wherein a sum of a height of the protruding portion from the base edges to the apex at a side of the first side edge and a height of the protruding portion from the base edges to the apex at a side of the second side edge is smaller than the width of the core section.

3. The cosmetic eyelid-reshaping tape according to claim 2, wherein the plurality of protruding portions are formed so as to have a uniform pitch in the longitudinal direction and the protruding portions provided adjacently to each other are smoothly connected at the base edge in each of the first side edge and the second side edge.

4. The cosmetic eyelid-reshaping tape according to claim 3, wherein the protruding portions are formed in a wave shape.

5. The cosmetic eyelid-reshaping tape according to claim 3, wherein the protruding portions are formed over the entirety, from one end to the other end in the longitudinal direction, of the first side edge and the second side edge of the member.

6. The cosmetic eyelid-reshaping tape according to claim 1, wherein the protruding portions on the first side edge and the protruding portions on the second side edge are formed in opposite phases in the longitudinal direction of the member.

7. The cosmetic eyelid-reshaping tape according to claim 6, wherein the member has a uniform width from one end to the other end in the longitudinal direction thereof.

8. The cosmetic eyelid-reshaping tape according to claim 1,
wherein the tape includes a member formed of the base material piece and the adhesive applied to both sides thereof, and a release sheet piece formed in the same shape as the member from a synthetic resin having good releasability from the adhesive and attached to an adhesive surface of the member to which the adhesive is applied, and
wherein the release sheet piece has an easy-to-tear portion, which is torn when pulled in the longitudinal direction, provided in the middle in the longitudinal direction so as to extend in the width direction.

9. The cosmetic eyelid-reshaping tape according to claim 1, wherein the cosmetic eyelid-reshaping tape is a double-eyelid forming tape and is configured such that, by attaching the attaching region of the member, stretched to a length in which the base material piece is extended, to the upper eyelid and making the member sink into the upper eyelid utilizing the elastic contractility of the base material piece after being extended, a depression extending along the member is formed in the upper eyelid, and, due to the upper eyelid being folded along the depression when the upper eyelid is opened, a crease of the double eyelid is formed.

10. A method for manufacturing the cosmetic eyelid-reshaping tape according to claim 1, comprising:
(1) preparing an adhesive sheet in which adhesive is applied to one or both surfaces of a base material sheet comprising synthetic resin and is used to form the base material piece; and
(2) obtaining the cosmetic eyelid-reshaping tape by cutting the adhesive sheet with a cutting blade with a cutting edge having the same outline shape as that of the protruding portions, while moving the cutting blade and the adhesive sheet relative to each other.

11. The cosmetic eyelid-reshaping tape according to claim 1, wherein
the thickness of the base material is from 40 to 80 μm, and the length of the member is from 25 to 40 mm.

12. The cosmetic eyelid-reshaping tape according to claim 11, wherein the thickness of the adhesive is from 40 to 60 μm.

* * * * *